(No Model.) 2 Sheets—Sheet 1.
G. W. SAMPLE.
DRAFT TUBE FOR SODA WATER FOUNTAINS.
No. 498,962. Patented June 6, 1893.
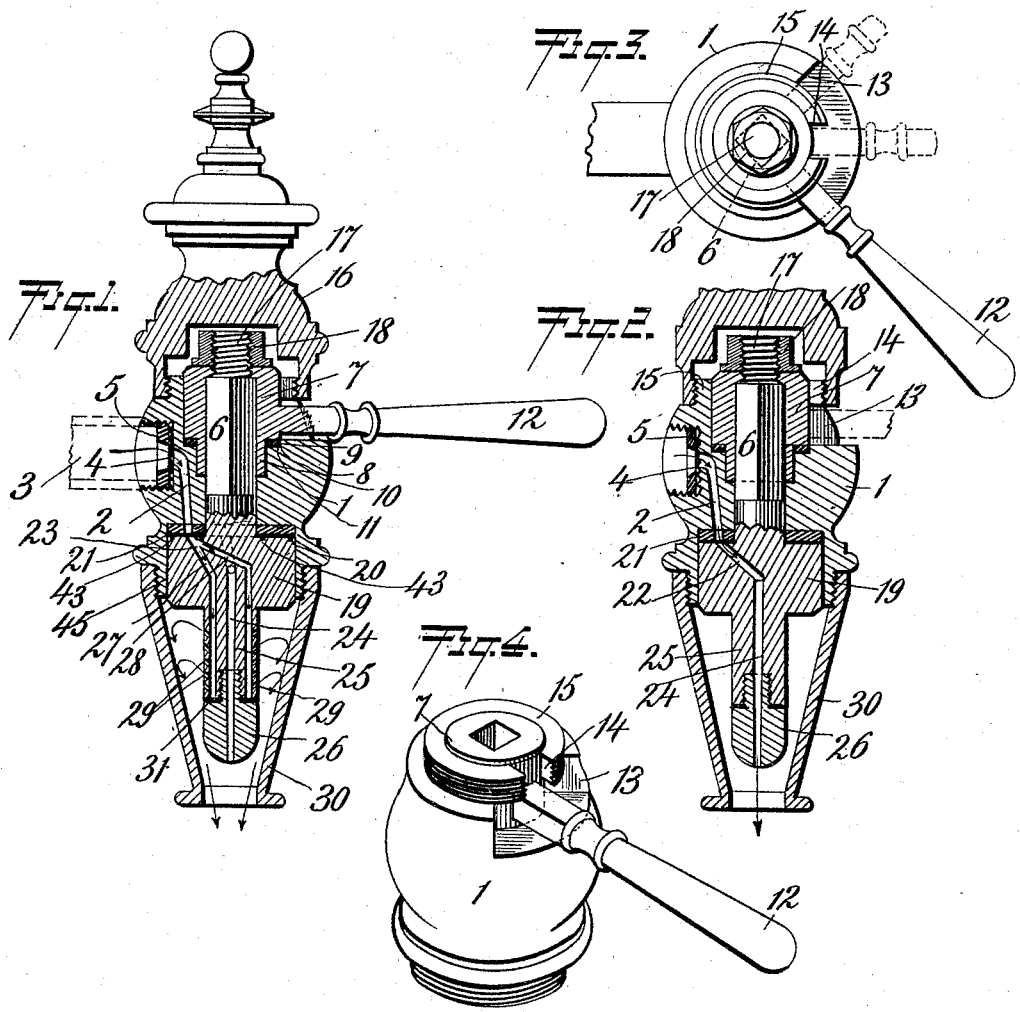
Attest:
F. H. Schott
Alfred T. Gage.
Inventor
George W. Sample,
by his Attorney.

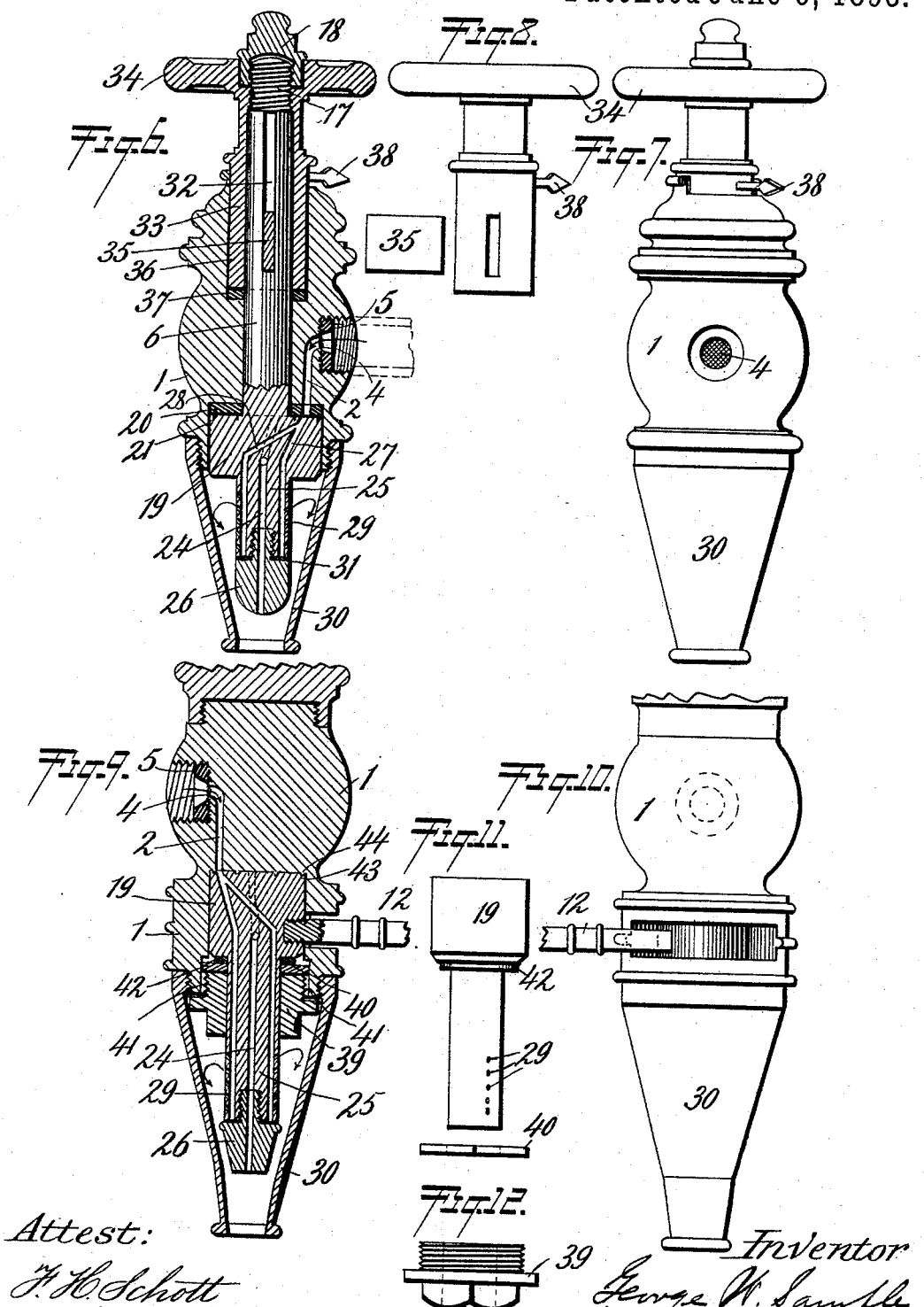

UNITED STATES PATENT OFFICE.

GEORGE WILLIAM SAMPLE, OF YORK, PENNSYLVANIA.

DRAFT-TUBE FOR SODA-WATER FOUNTAINS.

SPECIFICATION forming part of Letters Patent No. 498,962, dated June 6, 1893.

Application filed January 19, 1893. Serial No. 458,930. (No model.)

*To all whom it may concern:*

Be it known that I, GEORGE WILLIAM SAMPLE, a citizen of the United States, residing at York, in the county of York and State of Pennsylvania, have invented certain new and useful Improvements in Draft-Tubes for Soda-Water Fountains; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to draft tubes for soda water dispensing apparatus, and has for its object to provide an improved draft tube wherein the valve which controls the discharge of the soda water into the glass or tumbler is provided with one passage or channel for the discharge of the water in a forcible stream or jet for the purpose of mixing the sirup and the water, and with a plurality of passages or channels for the passage of separate streams or jets of the water to be mixed with the sirup and served to the user, the said plurality of passages or channels other than the channel for the jet to mix the water and sirup being connected with a common inlet port therefor, and the passage or channel for the mixing stream or jet being connected with another port, so that while there will be at least three passages or channels within the body of the valve for the passage of the water there will be only two inlet ports for the series of channels or passages whereby is obtained a better distribution of the soda water with a construction requiring less labor in its operation, and in which loose or leaking joints are not so liable to occur.

It further consists in providing the two channels or passages through which passes the water to mix with the sirup with a series of perforations extending outwardly in an upward direction so that the water will be projected upwardly in a series of small jets and be then directed by a conical nozzle to the glass in a copious but in a quiet or gentle flow so that the glass can be filled in less time than otherwise and the overflow of the glass guarded against.

It further consists in means for readily adjusting the valve against its seat so as to easily and quickly take up any wear as it occurs and thus insure a close joint between the valve and its seat.

It further consists generally in features of construction and arrangement hereinafter particularly described.

To the accomplishment of the foregoing and such other objects as may appear, the invention consists in the construction and in the combination of parts hereinafter particularly described and then sought to be specifically defined by the claims, reference being had to the accompanying drawings in which—

Figure 1 is a vertical section through the draft tube of the preferred form, with parts in full lines, and showing the valve in position to receive the water through the two passages or channels communicating with a common port; Fig. 2 a similar section with the upper part of the tube broken away and showing the valve in position to direct the water through the central channel or passage in a forcible stream for mixing the sirup and water. Fig. 3 is a plan view of the draft tube showing the valve handle in the three positions to which it may be moved, one extreme position being that which the handle occupies when the water is directed into the single port communicating with the plurality of passages, the other extreme position being that which the handle occupies when the central or mixing channel is in position to receive the water, and the middle position being that occupied by the handle when all the channels are cut off from the inflow of the water. Fig. 4 is a perspective of the intermediate portion of the draft tube which receives the stem of the controlling valve and contains the passage or channel which receives the water from the fountain and with which the ports of the valves are alternately made to register. Fig. 5 is a perspective of the controlling valve showing the two inlet ports in its face, and the series of perforations to one of the side discharge channels or passages. Fig. 6 is a vertical section through another form of the draft tube; having a hand wheel for operating the valve and provided with an index to indicate the several positions of the inlet ports of the valve. Fig. 7 is a side view of the same. Fig. 8 is a side view of the hand wheel and the sleeve which fits around the valve stem, and showing to one side the key which secures the sleeve to the stem. Fig. 9 is a vertical section through another form of draft tube with the upper portion broken away, and in which the valve is held against its seat by adjusting means applied from below. Fig. 10 is a side view of the same. Fig. 11 is a side view of the valve, and showing the series of perforations in one of the side passages or channels, and also a washer against which will bear the nut for adjusting and securing the valve in place; and Fig. 12 is a side view of the nut which adjusts and holds the valve in place.

In the drawings, the numeral 1 designates the intermediate portion of the draft tube or what will be hereinafter designated as the valve seat as it is the portion against which the valve seats. This portion is formed with a port or channel 2 into which the soda water is delivered from the fountain through a tube or pipe 3, the mouth of the port being covered by a screen 4 which may be held in place by a nut 5 so as to prevent the passage of foreign matter into the port. Through the valve-seat portion 1 passes the valve stem 6 which preferably is formed angular in cross section at a point in its length as indicated in Fig. 1 so as that a collar or sleeve 7 may be secured to it to turn therewith by the angular portion fitting in a correspondingly shaped opening in the collar, the lower portion of the collar being preferably reduced in thickness as indicated at 8 so that a shoulder 9 will be formed to work upon a leather or other packing 10 seated in a recess 11 formed in the portion 1. This collar receives the handle 12 by which the valve is manipulated, the handle moving in a way 13 formed in the part 1 as illustrated clearly in Fig. 4, the handle being placed in position through an opening 14 in the threaded portion 15 to which is screwed the ornamental top 16 of the draft tube. The upper portion of the valve 10 is formed with screw threads 17 so that a nut 18 may be applied thereto for the purpose of drawing the valve up against its seat and holding it in place, and so that the valve may be made to fit close to its seat when it becomes worn from constant use, and at other times.

The valve designated by the numeral 19 fits into a chambered portion 45 formed in the portion 1 and is secured to the lower part of the valve stem 6 and its face bears against a washer or packing 20 of leather or other suitable material which forms a part of the valve seat and is held against movement by any suitable means and is formed with a port 21 corresponding to the port 2. The valve itself has formed in its face a port 23 and also a port 22 so located that when the handle 12 is turned to one extreme the port 23 will be brought into register with the port 21 of the washer 20 and when turned to the other extreme the port 22 will be brought into register with the port 21, and when the handle is moved to a point intermediate of its two extremes both ports will be out of register with the port 21 and no water can then flow through any of the ports in the valve. The handle is thus made to serve as an index finger to indicate the position of the ports. The port 22 communicates with a channel or passage way 24 which extends downwardly through the body of the valve and through the nipple 25 extending from the lower face thereof and also through the tip 26 applied to the lower end of the nipple. This channel or passage way delivers the water which it receives from the port 2 with considerable force into the glass or tumbler containing the sirup so as to thoroughly agitate the liquids and cause a thorough mixing of the sirup with the water. The port 23 delivers the water received from the port 2 to a plurality of passage ways or channels 27 and 28 which extend through the body of the valve 19 and then down through the nipple 25, preferably on opposite sides of the channel or passage way 24. These two passage ways 27 and 28 communicate with the space outside of the nipple through a series of perforations 29 formed in each of the two passage ways, these perforations inclining upwardly so as to throw the water in small jets upwardly and against the inside wall of a nozzle 30 screwed onto the lower portion of the draft tube as illustrated. By thus projecting the water upwardly in small jets into the space between the nipple and the nozzle the force of the water is materially broken and it is caused to flow down the sides of the nozzle in a full stream and in a sufficient state of agitation to cause a thorough commingling of the water and sirup in the glass with the absence of such force as would tend to throw the water out of the glass or tumbler. By having the two channels or passage ways 27 and 28 independent of each other and yet leading from a port common to the two, and by employing the series of upwardly extending perforations 29, a better distribution of the water is obtained and a more satisfactory flow of it from the end of the nozzle secured than under other constructions.

The lower ends of the passage ways 27 and 28 are closed by the tip 26, between which and the end of the nipple may be placed a packing 31. The tip is screwed into the lower end of the nipple, and by unscrewing the tip access can be had to all the passage ways or channels so as to clean the same whenever necessary.

Instead of having a portion of the valve-stem made angular for the attachment of the operating handle as illustrated in Fig. 1 of the drawings, the stem may be round throughout its entire length, and may be provided with a hand wheel for operating the same as illustrated in Fig. 6. In this form the upper portion of the stem is provided with a slot 32 extending transversely through it, and a sleeve 33 having a hand wheel 34 is slipped over the valve-stem and secured thereto by a key 35 passed through this slot in the sleeve and into the slot of the valve stem, the sleeve 33 fitting and working in a bore 36 made in the top of the draft tube as illustrated in Fig. 6. A packing 37 of leather or suitable material may be placed under the lower end of the sleeve 33 at the bottom of the bore 36. In this form of construction the valve 19 is held against its seat by drawing it against the same by a nut 18 applied to the threaded portion 17 of the valve stem in manner similar to the construction illustrated in Fig. 1, the nut in this construction entering the top of the hand wheel 34 as illustrated in Fig. 6. By adjusting this nut the valve can be drawn up against its seat so as to take up any wear in the valve and so as to hold the valve closely against its seat at all times. The sleeve 33 is provided with an index finger 38 which will indicate the positions of the ports 22 and 23 of the valve 19 in like manner as the handle 12 under the operation described for the construction illustrated in Fig. 1 of the drawings.

In the form illustrated in Fig. 9 of the drawings the construction of the valve is the same as in the other two forms already described but the manner of holding the valve against its seat is different. In this form the valve is held against its seat by means of a nut 39 made to encircle the nipple 25 and provided with screw threads to engage corresponding threads on the portion 1 of the draft tube as illustrated in Fig. 9 of the drawings. This nut bears against a washer 40, preferably of angular form, working in suitable ways 41 of the portion 1, say, one way for each corner of the washer. This washer bears against a suitable packing 42 next the lower face of the valve 19, and by screwing the nut the valve face is pressed closely against its seat, and whenever any wear in the valve face or valve seat occurs the nut can be tightened so as to take up this wear. The valve in this construction is operated by a handle 12 as in the construction illustrated in Fig. 1 and this handle will serve as an index finger to show the positions of the ports 22 and 23 as in the form illustrated in Fig. 1 of the drawings. The face of the valve may be formed with circular grooves 43 to receive circular beads 44 on the valve seat which will serve as packings to prevent leakage at that point. These beads however may be omitted and a packing of leather corresponding to the packing 21 illustrated in the other figures of the drawings may be employed in place of the beads in which event the grooves 43 may serve to receive a suitable lubricant. The construction of the valve and the arrangement of the ports and of the channels or passage ways are the same in all the forms, and the description given to the operation in describing the construction illustrated in Fig. 1 will apply to all the forms and therefore need not be repeated for each form illustrated.

It will be observed that in all the forms the portion 1 is formed with the chambered portion 45 for the valve to fit in. This not only greatly simplifies the construction but affords a fixed, rigid housing for the valve not to be loosened or in any wise disturbed by the movements of the valve, and in which the valve can be readily inserted and removed.

I have described with particularity the details of construction of each of the several parts illustrated in the drawings but it is obvious that changes may be made in such details and the essentials of my invention still be employed and I am therefore not confined to the exact details illustrated.

Having described my invention and set forth its merits, what I claim is—

1. In a soda water draft tube having a port for the inlet of the water, a valve formed with separate ports adapted to be alternately brought into communication with said inlet port and formed with a passage or channel leading from one of said ports for delivering the water in a forcible stream or jet and with a plurality of passages or channels leading from said other port adapted to divide the water received through said port and deliver it in independent streams or jets, substantially as and for the purposes described.

2. In a soda water draft tube having a port for the inlet of the water, a valve formed with separate ports adapted to be brought alternately into communication with said inlet port and formed with a channel or passage way leading from one of said ports for delivering the water in a forcible stream, and with a plurality of channels or passages leading from said other port and adapted to divide into separate flows the water received from said port, the lower portions of said plurality of passages or channels discharging through a series of perforations to each channel for the purpose of delivering the water in a series of jets or streams from each channel, substantially as and for the purposes described.

3. In a soda water draft tube having a port for the inlet of the water, a valve formed with separate ports adapted to be brought alternately into communication with said inlet port and formed with a channel or passageway leading from one of said ports for delivering the water in a forcible stream and with a plurality of channels or passages leading from said other port and adapted to divide into separate flows the water received from said port, the lower portion of said plurality of passages or channels discharging through a series of upwardly inclined perforations to each channel for the purpose of delivering the water in a series of upwardly projected jets or streams from each channel, substantially as and for the purposes described.

4. In a soda water draft tube having a port for the inlet of the water, a valve formed with separate ports adapted to be brought alternately into communication with said inlet port, a nipple projecting from said valve, a channel or passage way leading from one of said ports through said valve and said nipple, a plurality of channels or passages leading from said other port and through said valve and said nipple and adapted to divide into separate flows the water received from said port, a series of perforations formed in the lower portion of said nipple and communicating with said plurality of passages through the nipple, and a tip applied to the end of the nipple and having a channel for the passage of water, substantially as and for the purposes described.

5. In a soda water draft tube, the combination with a valve seat portion formed with an inlet for the water and with a chambered portion to receive the valve, of a valve fitted in said chambered portion and formed with separate ports adapted to be alternately brought into communication with said inlet port, and having a passage or channel leading from one of said ports and a plurality of passages or channels leading from the other port and adapted to divide the water received from said port into separate flows, means for adjusting and for holding said valve against its seat, and means for operating said valve, substantially as and for the purposes described.

6. In a soda water draft tube, the combination with the valve seat portion formed with a port for the inlet of water, of a valve formed with passage ways communicating with ports adapted to be alternately brought into communication with said inlet port, a valve-stem extending from the valve through the valve-seat portion, a sleeve fitted to the upper portion of the valve stem and secured thereto, means applied to said valve stem for adjusting and holding the valve against its seat, means connected with said sleeve for operating the valve, and an index to indicate the positions of the ports in the valve in relation to the inlet port in the valve seat portion, substantially as and for the purposes described.

In testimony whereof I affix my signature in presence of two witnesses.

GEORGE WILLIAM SAMPLE.

Witnesses:
   GEOFFRY P. YOST,
   FRED. HEATER.